July 7, 1942.    G. WIDMER ET AL    2,288,964
PROCESS FOR THE PRODUCTION OF MELAMINE
Filed Feb. 3, 1940
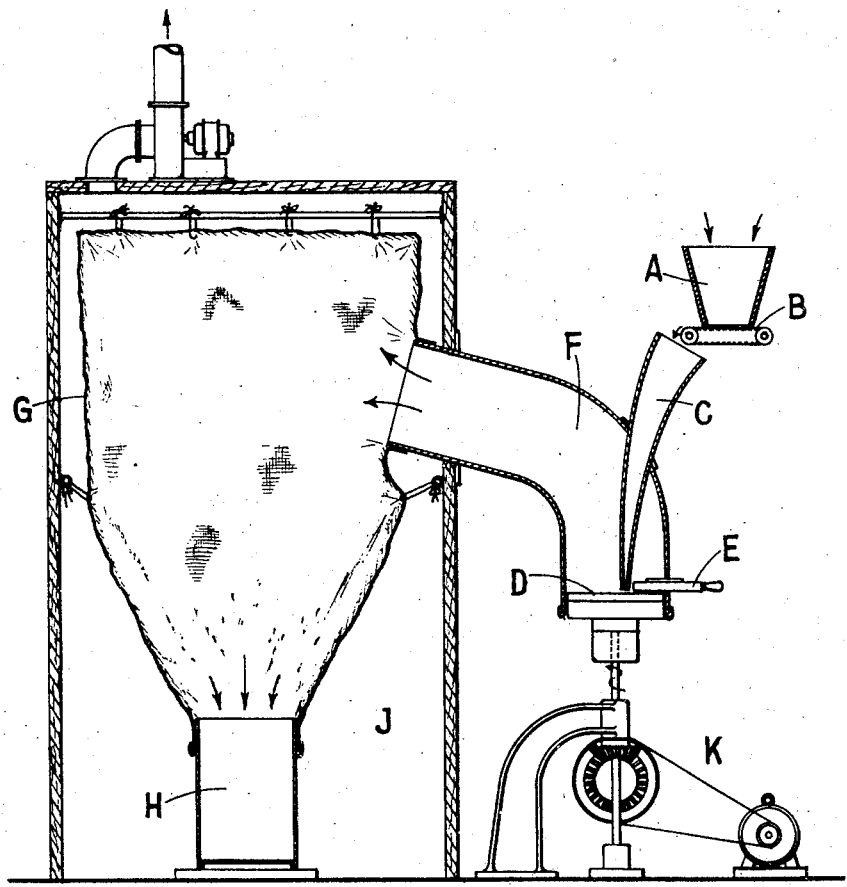

Patented July 7, 1942

2,288,964

UNITED STATES PATENT OFFICE

2,288,964

PROCESS FOR THE PRODUCTION OF MELAMINE

Gustave Widmer and Josef Jakl, Basel, and Willi Fisch, Binningen, Switzerland, assignors, by mesne assignments, to Ciba Products Corporation, Dover, Del.

Application February 3, 1940, Serial No. 317,193
In Switzerland March 30, 1939

2 Claims. (Cl. 260—248)

Melamine which has been manufactured by the usual technical processes is not chemically pure. For example, the crude melamine obtained from dicyandiamide and ammonia in the autoclave, in spite of the fact that it contains about 97% pure melamine, has a light greyish to greybrown color, and yields with formaldehyde condensation solutions which are colored more or less brownish-yellow, and which, in spite of the use of decolorizing agents, are unsuitable for many purposes. An endeavour has therefore been made to discover a simple method of purifying crude melamine and other raw materials which contain melamine, which will permit the manufacture of practically pure melamine on the technical scale.

The most important known method of purification is that of crystallization. Liebig (Annalen der Pharmacie, vol. 10, page 19, 1934) has described melamine as being soluble with difficulty in cold water but more readily soluble at the boil. It is actually possible, particularly by the aid of decolorizing carbon, to obtain a product which yields light-colored to practically colorless condensation solutions. The disadvantage of this process is the large quantity of water necessary for the recrystallization of large quantities of crude melamine.

Sublimation may be mentioned as a further method of purification. In this connection, Drechsel (Journal für prakt. Chemie, vol. 13, page 332, 1876), states that melamine sublimes unchanged in the form of magnificent small crystals, when it is heated sufficiently strongly but not allowed to melt. By this method, Drechsel was able to sublime more than a gram of melamine in a stream of hydrogen without decomposition, the only residue being a trace of a coal-like substance. Experiments in this direction have proved that the above statements hold good for small quantities, such as Drechsel describes. If larger quantities be used, the extended heating necessary causes decomposition of a portion of the melamine, and the yield of sublimed melamine drops below 50%.

If crude melamine be heated in the form of a thin layer to temperatures which lie below its melting point, for example, to 300–340° C., a slow evaporation, with the formation of fumes, takes place, leaving as final residue a light, voluminous powder.

A rather more favorable result is obtained by sublimation in a vacuum, particularly if smaller quantities are used. The sublimation, however, takes place only slowly, which causes a partial decomposition of the melamine on account of a too long heating period. This results in a great reduction of the yield, and therefore the manufacture of large quantities in this manner does not come in question.

The behaviour of melamine at temperatures above its melting point has not yet been more exactly described. Liebig, in the article mentioned above, states "On heating, the crystals decrepitate and melt to form a transparent liquid, which solidifies in a crystalline state on cooling. On heating more strongly, the melted substance is drawn up the sides of the tube without subliming: if a portion of it flows on to a glowing part of the glass, it is decomposed with liberation of ammonia, leaving a lemon-yellow colored residue which, on heating to a glow, disappears completely with the formation of cyanogen and nitrogen." Drechsel confirms these statements of Liebig in his article above quoted. Ostrogovich (Gazetta Chimica Italiana, vol. 65, page 577, 1937), states that melamine, in the pure state, melts at 347° C. (354° C. corrected) with liberation of gas. The evolution of gas points to a partial decomposition.

An economical purification of melamine on the technical scale is impossible, according to the known literature.

It has now been shown in a surprising manner that, when melamine is heated in the form of a thin layer to temperatures which lie above its melting point (that is, for example, to 400° C.), it melts immediately, volatilizes in the form of a white, microcrystalline vapor and may be obtained in a chemically pure state if it be removed from the heating zone in a suitable way, for instance by means of a gas stream. This is the more surprising insofar as it could not be foreseen that no appreciable decomposition of the melamine would take place.

The melamine obtained in this manner may be shown by analysis to possess the calculated theoretical values.

The small remaining residue is a yellow-brown mass, which consists, in the main, of the deamidation products of melamine, such as melam, melem and mellone.

The process may be carried out in such a manner, for example, that melamine is continuously drawn on to a heated surface, which is preferably heated to a temperature of about 400° C.—for example, a rotating electric hot plate may be used. The escaping melamine is removed from the heating zone by means of a current of gas and is caught in suitable containers—for example, filter bags, dust chambers, etc. It is a white, very light powder, which dissolves very rapidly in water and in aqueous formaldehyde on account of its fine state of division. It yields a solution which is practically colorless.

The temperature range of the heating surface which is preferable for this process lies between 350 and 450° C.

*Example*

3400 gms. of crude melamine (97%) are poured, a little at a time, into the feeding funnel (marked A in the accompanying drawing) and, by means of the carrier band B, are fed continuously in a thin stream through the charging funnel C on to the rotating electrically heated plate D, which is maintained at about 400° C. and is driven by the transmission K. Charging may be regulated either by the quantity of crude melamine fed into the apparatus or by the speed of rotation of the hot plate. Immediately on contacting the hot plate, the melamine melts and escapes instantaneously in the form of a white vapor, consisting of pure, micro-crystalline melamine. It escapes through a wide outlet tube F, which fits exactly over the hot plate, and which is connected at the other end with a large bag of filter cloth G which, in its turn, connects with a collecting reservoir H below. The bag is contained in a closed chamber J in which a slightly reduced pressure is maintained. In this manner, the necessary air current is attained, which draws the volatilized melamine into the bag: this air current is to be regulated in such a manner that only melamine—and not flying dust, originating from the residue which remains on the hot plate—is transferred into the bag. The residue is continuously removed from the hot plate by means of a scraper E and should accumulate in thin leaflets, having a yellow-brown color. The experiment described above, using a hot plate of 22 cm. diameter and one feeding system only for the crude melamine, should require about 3 hours for its completion. The yield of sublimed pure melamine amounts to 3100 gms., representing 91% of the crude melamine used.

By increasing the size of the heating surface of the hot plate and by using more than one feeding system, purification of the crude melamine may easily be undertaken on a technical scale.

Instead of using a reduced pressure in the enclosed chamber J to remove the pure melamine formed, the charging side of the apparatus may be enclosed, and work may be carried out with slightly increased pressure on this side, using air or another gas, such as nitrogen, hydrogen, etc., as the conveying gas.

What we claim is:

1. Process for the preparation of pure melamine from raw materials containing melamine, comprising delivering the raw material containing melamine on to heated surfaces which are heated to a temperature above the melting point of melamine, in such a manner that immediate volatilization of the melamine takes place and the melamine vapor thus formed is removed from the heating zone by means of a current of gas and is collected in a suitable manner.

2. Process for the preparation of pure melamine from raw materials containing melamine, comprising delivering the raw material containing melamine on to heated surfaces which are heated to a temperature between 350° and 450° C., in such a manner that immediate volatilization of the melamine takes place and the melamine vapor thus formed is removed from the heating zone by means of a current of gas and is collected in a suitable manner.

GUSTAVE WIDMER.
JOSEF JAKL.
WILLI FISCH.